(12) United States Patent
Domingues et al.

(10) Patent No.: US 12,149,136 B2
(45) Date of Patent: Nov. 19, 2024

(54) STATOR WITH PRINTED END TURNS AND METHODS OF MAKING THE SAME

(71) Applicant: BorgWarner Inc., Auburn Hills, MI (US)

(72) Inventors: Gabriel Domingues, Noblesville, IN (US); Joshua B. Lahrman, Fishers, IN (US); Matthew R. Conner, Franklin, IN (US); Kirk Neet, Noblesville, IN (US); David A. Fulton, Anderson, IN (US)

(73) Assignee: BorgWarner Inc., Auburn Hills, MI (US)

( * ) Notice: Subject to any disclaimer, the term of this patent is extended or adjusted under 35 U.S.C. 154(b) by 98 days.

(21) Appl. No.: 17/716,092

(22) Filed: Apr. 8, 2022

(65) Prior Publication Data

US 2022/0329124 A1 Oct. 13, 2022

Related U.S. Application Data

(60) Provisional application No. 63/173,241, filed on Apr. 9, 2021.

(51) Int. Cl.
*H02K 3/28* (2006.01)
*H02K 3/26* (2006.01)
*H02K 15/04* (2006.01)

(52) U.S. Cl.
CPC ............ *H02K 3/28* (2013.01); *H02K 3/26* (2013.01); *H02K 15/0407* (2013.01); *H02K 15/0414* (2013.01)

(58) Field of Classification Search
CPC .. H02K 15/0407; H02K 3/26; H02K 15/0414; H02K 15/0081; H02K 3/12; H02K 3/28
See application file for complete search history.

(56) References Cited

U.S. PATENT DOCUMENTS

| | | | |
|---|---|---|---|
| 4,115,915 A * | 9/1978 | Godfrey | H02K 3/505 310/71 |
| 6,894,417 B2 * | 5/2005 | Cai | H02K 3/12 310/201 |

(Continued)

FOREIGN PATENT DOCUMENTS

DE 102018200035 A1 * 7/2019

OTHER PUBLICATIONS

DE-102018200035-A1 machine translation Mar. 26, 2024.*

*Primary Examiner* — Leda T Pham
(74) *Attorney, Agent, or Firm* — Maginot, Moore & Beck, LLP (57) ABSTRACT

A method and arrangement is disclosed herein for making a stator with 3D printed end turns. The stator includes a stator lamination stack with semi-closed slots. Straight I-pin wire segments are housed in the slots of the stator lam stack and form the in-slot segments of a stator winding arrangement. The end turns of the winding arrangement are provided by a conductive material that is 3D printed material at both axial ends of the straight I-pins. The end turns result in a winding arrangement with diamond coils that are interlocked. The 3D printing of the end turns makes the winding arrangement possible, as the winding arrangement is configured such that it cannot be inserted into the lamination stack in a radial direction (i.e., via any slot openings at the inner diameter or outer diameter).

18 Claims, 9 Drawing Sheets

(56) References Cited

U.S. PATENT DOCUMENTS

| | | | | |
|---|---|---|---|---|
| 7,759,834 B2* | 7/2010 | Onimaru | ............... | H02K 3/18 |
| | | | | 310/201 |
| 8,587,177 B2* | 11/2013 | Kitamura | ............ | H02K 15/045 |
| | | | | 310/179 |
| 2009/0200888 A1* | 8/2009 | Tanaka | .................... | H02K 3/12 |
| | | | | 310/195 |
| 2009/0267441 A1* | 10/2009 | Hiramatsu | .......... | H02K 15/066 |
| | | | | 310/215 |
| 2017/0033630 A1* | 2/2017 | Tamura | ................... | H02K 3/18 |
| 2018/0342918 A1* | 11/2018 | Hino | ....................... | H02K 3/12 |
| 2020/0244125 A1 | 7/2020 | Neet | | |
| 2020/0244126 A1 | 7/2020 | Neet et al. | | |

* cited by examiner

STATOR WITH PRINTED END TURNS AND METHODS OF MAKING THE SAME

FIELD

The present disclosure relates to the field of electric machines, and more particularly, end-turn connections for winding arrangements.

BACKGROUND

Winding arrangements are often inserted into the slots of a stator via openings at the inner diameter of the stator core. However, inserting conductors via the inner diameter limits the configuration of the winding arrangement. It would be advantageous to provide a winding arrangement having a configuration that is not limited to one that may be inserted via the inner diameter. In association with this, it would also be advantageous to provide a method for making such a winding arrangement.

SUMMARY

In at least one embodiment, a stator for an electric machine includes a core including a plurality of slots and a winding arrangement positioned on the core. The winding arrangement includes (i) a plurality of axial conductors positioned in the slots of the stator core, and (ii) a printed winding head including a plurality of printed end turns positioned on an end of the core. Each printed end turn extends between a pair of the axial conductors.

In at least one embodiment a stator for an electric machine includes a stator core defining a plurality of slots and a winding arrangement including a plurality of coils positioned around the stator core. Each coil includes in-slot segments and head segments defining end turn segments and coil leads. Each coil is positioned next to a corresponding adjacent coil in the winding arrangement. The head segments of each coil and the corresponding adjacent coil are interlocked such that one head segment of each coil is radially inward from a coil lead of the corresponding adjacent coil and radially outward from a head segment of the corresponding adjacent coil.

Also disclosed herein is a method of forming a winding arrangement for an electric machine, the method includes inserting a plurality of axial conductors into slots of a stator core. The method further includes printing end turns positioned on an end of the stator core, wherein each printed end turn extends between a pair of axial conductors in the slots of the stator core.

DESCRIPTION

Figure 1:
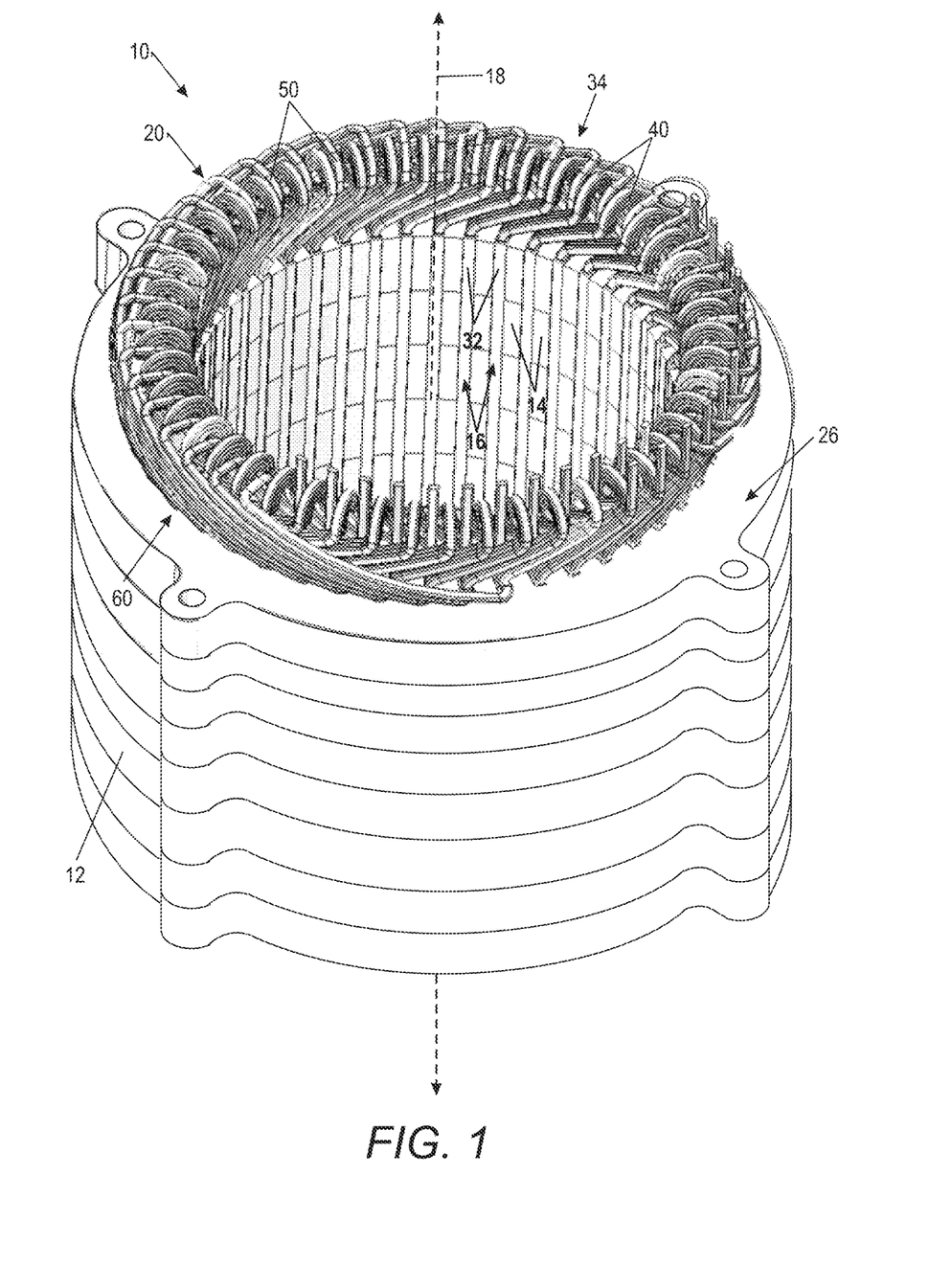
FIG. 1 is a perspective view of a stator including a winding arrangement having a printed winding head positioned at an end of a stator core.

A stator for an electric machine is disclosed herein. As shown in FIG. 1, the stator 10 includes a stator core 12 with a winding arrangement 20 positioned on the stator core 12. The winding arrangement 20 includes a plurality of in-slot conductors 32 and a printed winding head 34. The printed winding head 34 includes end turns 40 that extend between the in-slot conductors 32. Together, the in-slot conductors 32 and the end turns 40 form a plurality of electrically conductive coils 30 that are interlocked and retained upon the stator core 12.

Stator Core

Figure 2:
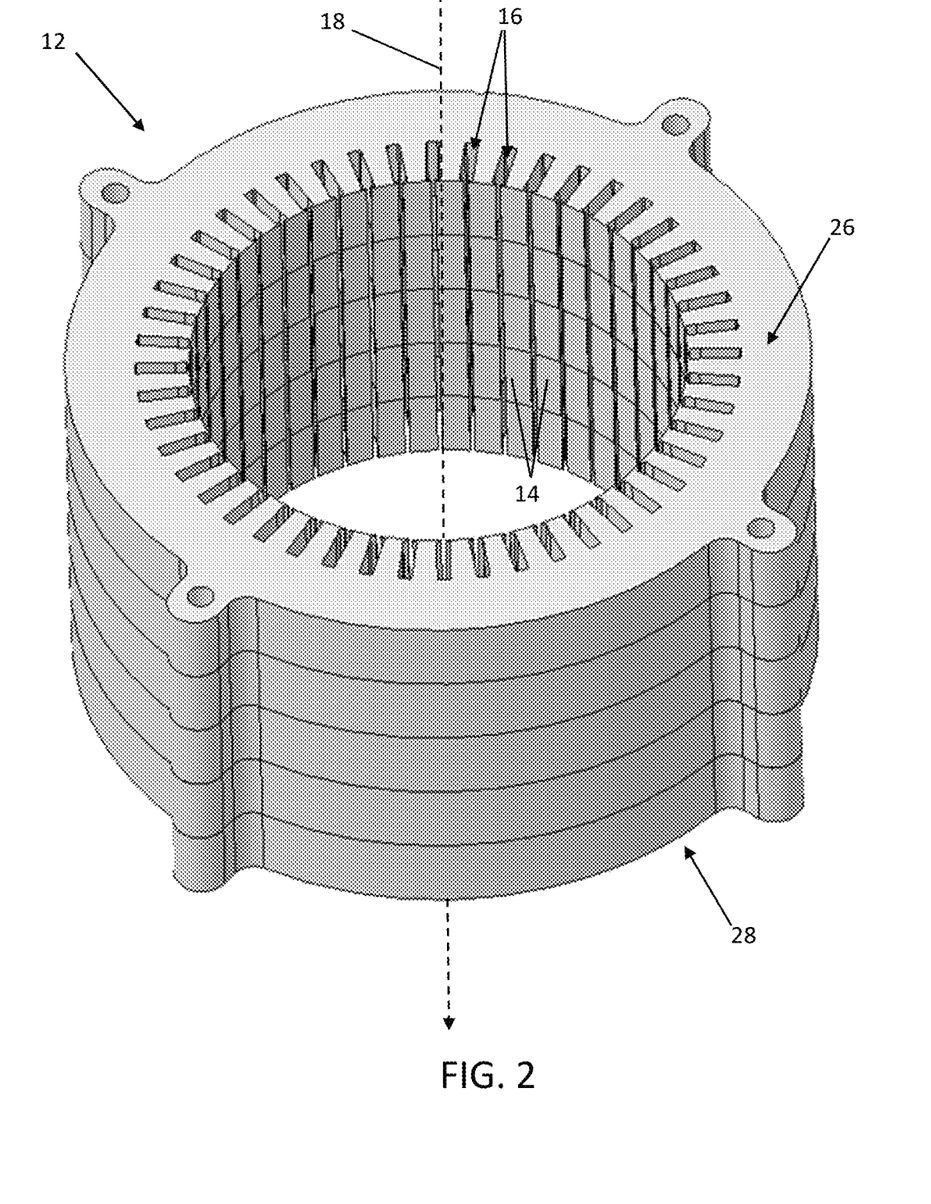
FIG. 2 is a perspective view of the stator core of FIG. 1 in isolation from the winding arrangement, the stator core including semi-closed slot openings.

FIG. 2 shows a view of the stator core 12 in isolation from the winding arrangement 20. The stator core 12 is comprised of a ferromagnetic material and is typically formed from a plurality of steel sheets that are stamped and stacked upon one another to form a lamination stack. The stator core 12 is generally cylindrical in shape as defined by a center axis 18, and includes an inner perimeter surface and an outer perimeter surface. The inner perimeter surface defines an inner diameter (ID) for the stator. The outer perimeter surface defines an outer diameter (OD) for the stator.

A plurality of teeth 14 are formed on the interior of the stator core 12 and directed inwardly toward the center axis 18. Each tooth 14 extends radially inward and terminates at the inner perimeter surface. Axial slots 16 are formed in the stator core 12 between the teeth 14. Each slot 16 is defined between two adjacent teeth, such that two adjacent teeth form two opposing radial walls for one slot. The teeth 14 and slots 16 all extend from a first end 26 to a second end 28 of the core.

The slots 16 may be open, closed, or semi-closed along the inner perimeter surface of the stator core 12. When the slots 16 are semi-closed, each slot 16 has a width that is smaller at the inner perimeter surface than at more radially outward positions (i.e., slot positions closer to the outer perimeter surface). In addition to the openings to the slots 16 through the inner perimeter surface (i.e., for open and semi-closed slots), openings to the slots are also provided the opposite ends 26, 28 of the stator core 12.

As shown in FIG. 1, the stator core 12 is configured to retain the winding arrangement 20 within the slots 16 of the stator core 12. In at least one embodiment, the winding arrangement 20 is formed from a plurality of interconnected coils that are retained within the slots 16. The coils are comprised of multiple segments of copper or other electrically conductive material that form loops. The loops generally extend through the slots and wrap around the teeth of the core.

Coils of Winding Arrangement

Figure 3:
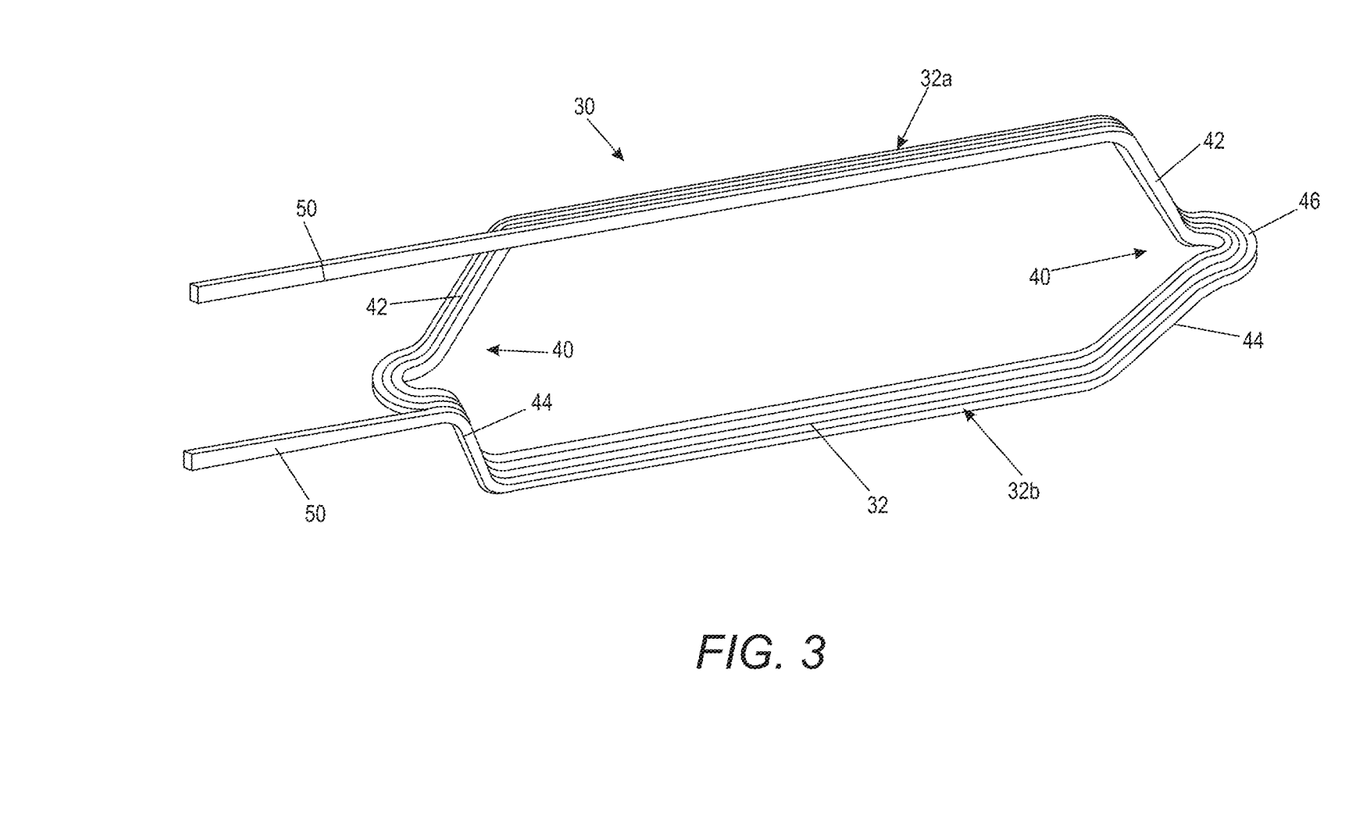
FIG. 3 is a perspective view of a diamond coil of the winding arrangement of FIG. 1, the coil including in-slot segments, end-turns, and coil leads.

With reference now to FIG. 3, one of the coils 30 of the winding arrangement 20 is shown in isolation from the winding arrangement. As shown in FIG. 3, each coil is a diamond coil that includes a plurality of straight in-slot conductors 32, a plurality of 3D printed end turns 40, and a plurality of 3D printed coil leads 50. As will be recognized from FIG. 3, a coil having such portions 32, 40 and 50 may generally be considered to have a diamond-like shape. The straight in-slot conductors 32 (which may also be referred to herein as "in-slot segments") extend through the slots 16 from one end of the core 12 to the opposite end of the core. Two groups 32a and 32b of in-slot segments 32 are associated with each coil 30. Each group 32a, 32b of in-slot segments 32 extends through a different slot of the core. Multiple in-slot segments are included in each group 32a, 32b. In the embodiment of FIG. 3, each group 32a, 32b includes four in-slot segments 32. These four in-slot segments are arranged in single file within the slots 16. Each slot is configured to retain some number of in-slot segments in layers of the slot. In at least one embodiment, the slots 16 are configured to retain twice the number of in-slot segments 32 as the number of conductors of each group 32a, 32b (e.g., each group 32a, 32b includes four in-slot conductors 32, and each slot is configured to retain eight in-slot conductors).

Figure 4:
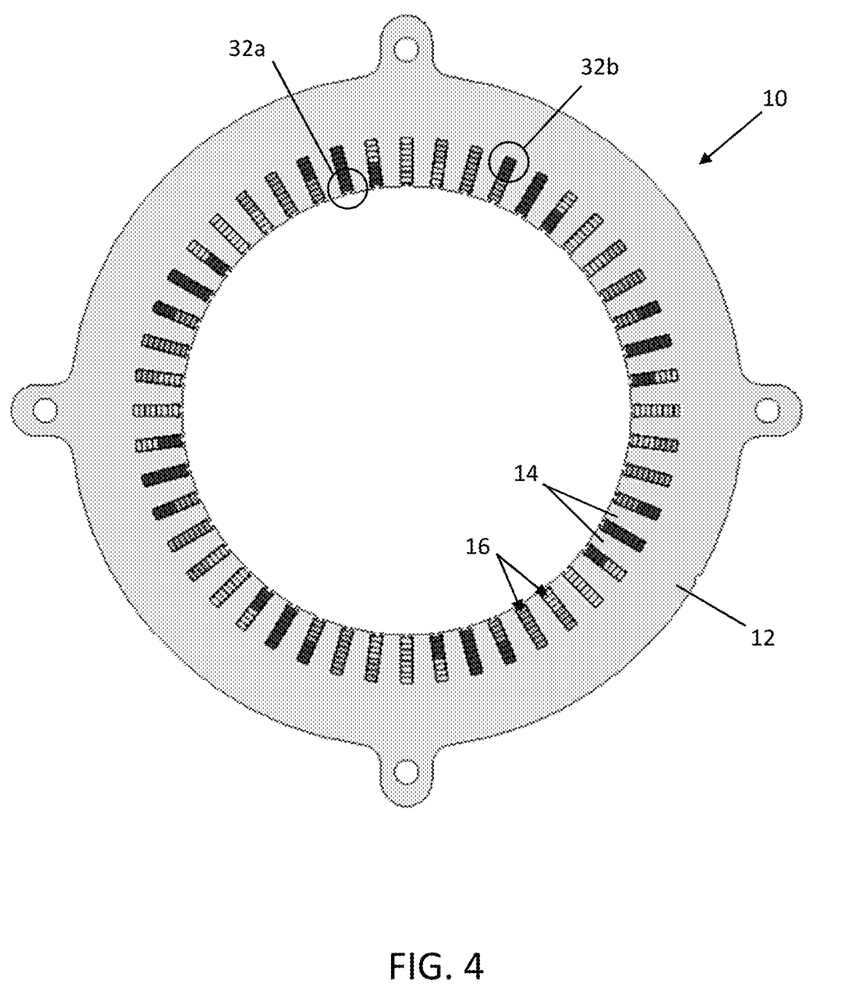
FIG. 4 is a cross-sectional view of the stator core of FIG. 1 with conductors positioned in the slots of the stator core, wherein different shading of conductors identify different phases of the winding arrangement.

FIG. 4 shows a cross-sectional view of the stator 10 with the in-slot segments 32 arranged in layers in the slots 16 of the stator core 12. As shown in FIG. 4, eight in-slot segments 32 are positioned in each slot 16 of the stator core 12. The first group 32a of in-slot segments of an exemplary coil are noted in a first circle, and the second group 32b of in-slot segments of the same coil are noted in a second circle. While FIG. 4 shows the conductors are arranged in eight layers in the slots, and each phase is arranged in a 4-8-4 pattern within the slots, it will be recognized that different winding configurations are also contemplated.

Figure 5:
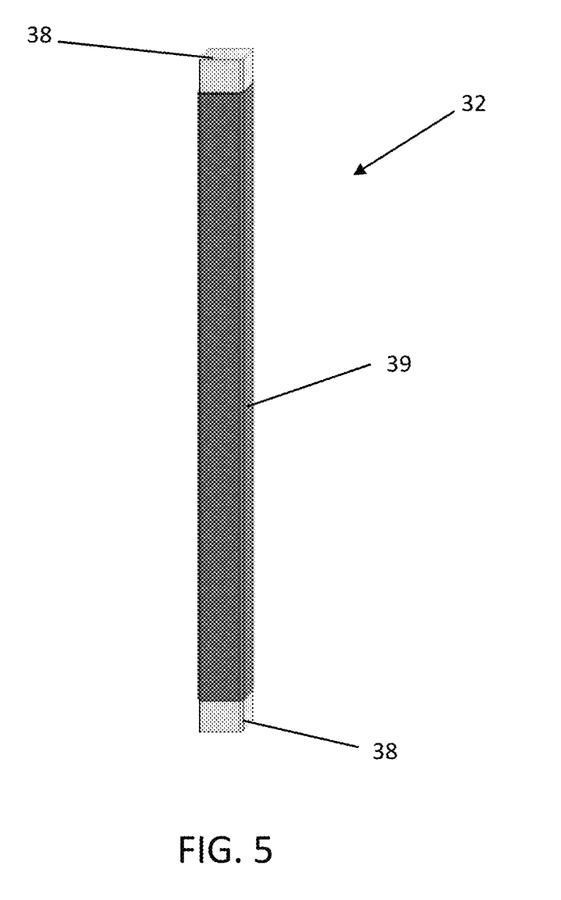
FIG. 5. is a perspective view of an exemplary I-pin that provides one of the in-slot segments of each diamond-coil in the winding arrangement of FIG. 1.

FIG. 5 shows an example of one of the straight in-slot segments 32 in isolation from the coil. As shown in FIG. 4, the in-slot segment 32 is provided by a straight I-pin conductor. The I-pin is comprised of a solid length of electrically conductive material such as copper. The ends 38 of the I-pin are exposed, but the central portion of the I-pin is coated, wrapped or otherwise encased in insulation 39. The insulation 39 is provided by an electrically conductive material such as epoxy or insulative paper. As, discussed in further detail herein, the I-pin conductors may be easily inserted into the stator slots 16 during assembly of the winding arrangement.

With reference again to FIG. 3, in addition to the in-slot segments 32, each coil 30 further includes end turns 40 and coil leads 50. The end turns 40 and coil leads 50 are provided as part of the winding heads 34 and 36 of the winding arrangement 20, and are therefore arranged axially beyond the respective ends 26, 28 of the stator core 12 (each collection of conductors on each axial end may also be referred to as simply a "head"). As shown in FIG. 3, the end turns 40 (which may be also referred to as "end loops") extend between the two groups 32a, 32b of in-slot segments. In other words, each end turn 40 provides a bridge from the end of a conductor in one group 32a to the end of a conductor in another group 32b. Each end turn 40 includes a first angled portion 42 (which may also be referred to herein as a "first segment") and a second angled portion 44 (which may also be referred to herein as a "second segment"). The first segment 42 extends along a first end turn direction that is angled relative to the axial direction (i.e., angled relative to center axis 18). Similarly, the second segment 44 extends along a second end turn direction that is angled relative to the axial direction. The two segments 42, 44 meet at a vertex 46 of the end turn. The vertex 46 defines the portion of the end turn where the coil 30 changes direction as it loops around the core (e.g., changing from a direction moving axially away from the core back to a direction moving axially toward to core). The angled portions 42, 44 of the coil 30 and the associated vertices result in a coil with a diamond-like shape.

Similar to the in-slot segments 32, the end turns 40 are also comprised of a conductive material, such as copper. As discussed in further detail herein, the end turns 40 may be provided by as 3D printed copper end turns that are printed on the ends of the in-slot segments 32 and arranged on one or both axial ends 26, 28 of the core 12.

With continued reference to FIG. 3, each coil 30 includes two coil leads 50. Each coil lead provides a path into or out of the looping portions of each coil. In other words, if the coil body is considered to include the in-slot segments 32 and the end turns 40, the coil leads 50 provide a path leading to the coil body. FIG. 3 shows a first coil lead 50a that may be considered a "straight" coil lead because it extends only in an axial direction directly from the in-slot segments 32, and is not angled like the segments 42, 44 of the end turn 40. FIG. 3 also shows a second coil lead 50b that may be considered "bent" or "angled" because a portion of the coil lead 50a follows the angle of the end turn prior to extending away from the coil body in the axial direction near the apex 46 of the end turn 40. While both a straight coil lead 50a and a bent coil lead 50b are shown in FIG. 3, in at least one embodiment, both coil leads 50 are straight coil leads (i.e., both coil leads extend axially in alignment with the straight in-slot segments 32, similar to the first coil lead 50a), or alternatively, both coil leads are angled coil leads.

Complete Winding Arrangement

The plurality of coils 30 are connected together to form the winding arrangement 20. To this end, the winding head 34 on the first end of the core 12 includes various head segments, including the end turn segments and coil leads discussed above, as well as a plurality of connection segments 60 that provide connections between the coils. As shown in FIG. 1, each connection segment 60 extends between the coil leads 50 of two different coils. In the embodiment disclosed herein, the connection segments 60 extend in a circumferential manner between the coils at a position that is radially outward from the end turns 40. Similar to the coils 30, the connection segments are also comprised of copper or another electrically conductive material that is typical in winding arrangements for electric machines.

Figure 6:
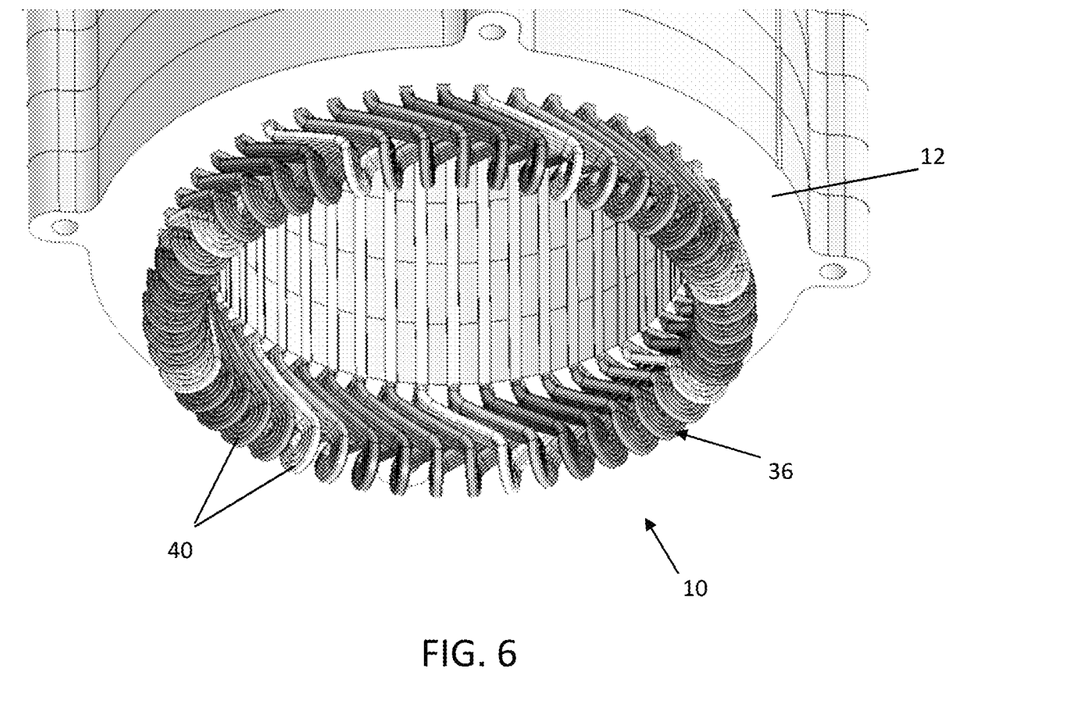
FIG. 6 is a perspective view of a second 3D printed winding head at an opposite end of the stator core of FIG. 1, wherein the winding head is printed so that the printed copper extends from one end of the I-pins of FIG. 5.

FIG. 6 shows a second winding head 36 provided on the opposite end of the stator core from the first winding head 34 (shown in FIG. 1). The winding head 34 only includes end turns 40, and does not include coil leads 50 or connection segments 60. Together FIGS. 1 and 6 show a single stator core 12 with a winding arrangement 20 including in-slot segments comprised of I-pins positioned in the slots of the stator core and winding heads 34 and 36 provided on opposite axial ends of the stator core.

Together the coils 30 and the connection segments 60s form a winding arrangement 20 with a plurality of phase windings. In at least one embodiment, the winding arrangement includes three phase windings (e.g., phase U windings, phase V windings, and phase W windings) with multiple paths for each phase. The three phase windings may be star ("Y") or delta ("Δ") connected, depending on the desired winding configuration.

Interlocking Coils of Complete Winding Arrangement

Figure 7:
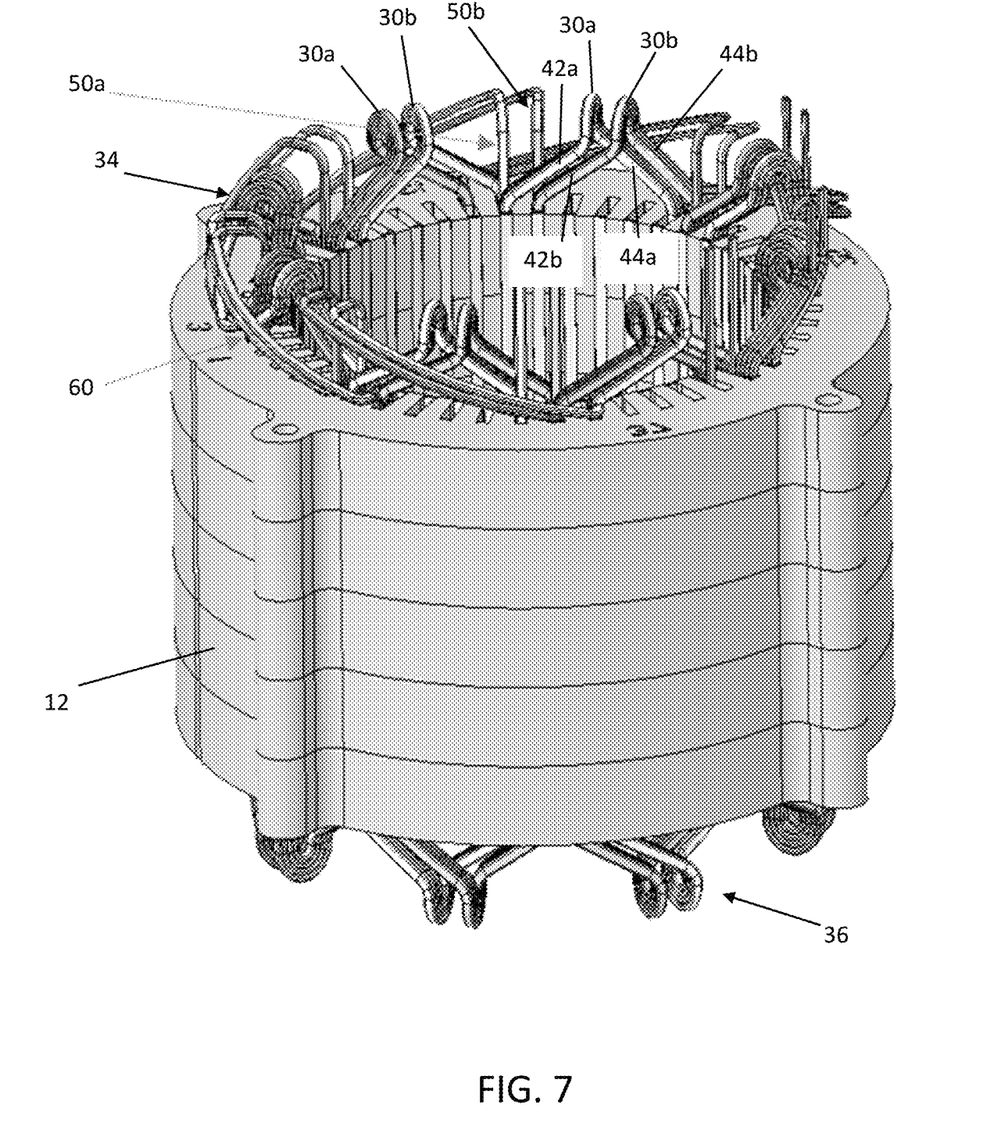
FIG. 7 is a perspective view of the stator of FIG. 1 with only a partial amount of the conductors of the winding heads shown in order to illustrate the interlocking relationship between each coil and an adjacent coil.
Figure 8:
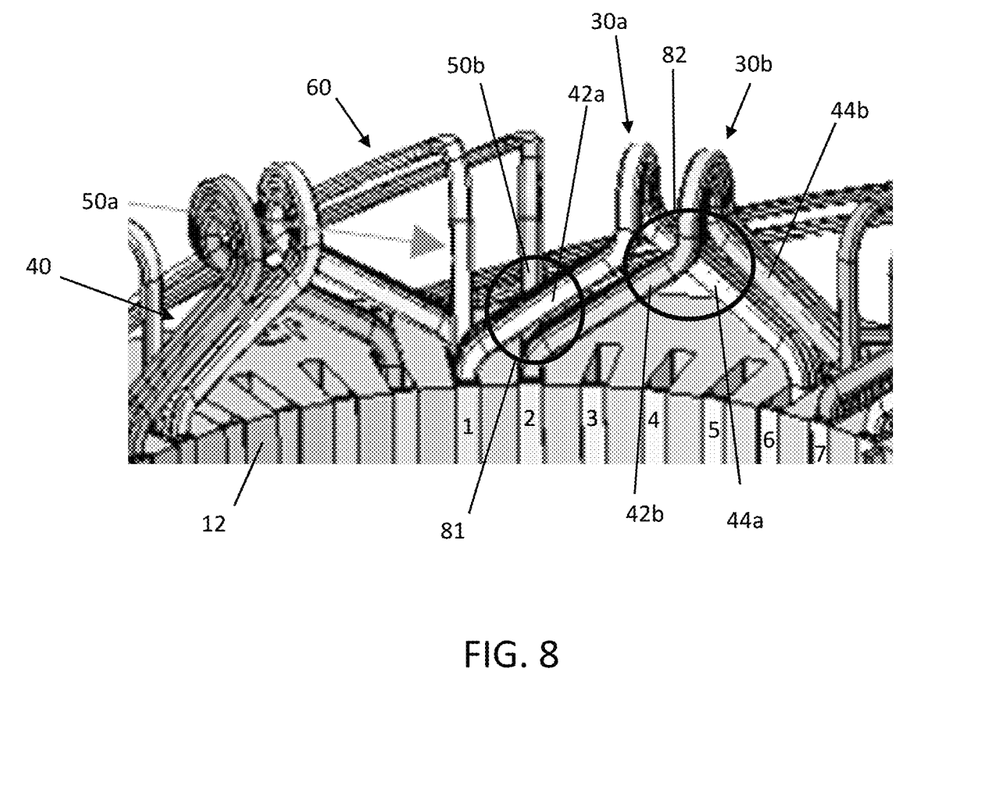
FIG. 8 is an enlarged view of two adjacent coils in the winding head at one end of the stator of FIG. 7 in order to further illustrate the interlocking relationship between the two adjacent coils.

FIGS. 7 and 8 show a group of coils 30 for one phase of the winding arrangement positioned on the core 12 in isolation from the coils of the other phases. Showing only a limited number of the conductors of the winding head 34 better illustrates the interlocking nature of the coils 30 in the winding arrangement 20. As shown in FIG. 7, the winding arrangement 20 is formed from a plurality of diamond coils 30, similar to those shown in FIG. 3. Each coil 30a of the winding arrangement is positioned next to a corresponding adjacent coil 30b around the entire circumference of the core. In particular, each coil 30a with in-slot segments 32 that extend through a specific slot is adjacent to a corresponding coil 30b with in-slot segments that extend through a slot that is immediately adjacent to the specific slot. For example, coil 30a includes in-slot segments extending through the slots identified as "1" and "6" in FIG. 8. The corresponding adjacent coil 30b includes in-slot segments extending through the slots identified as "2" and "7" in FIG. 8.

The diamond coils 30 of the winding arrangement 20 are connected together with the series connections 60 to provide complete winding paths for respective phases of the stator winding. The winding head 34 includes coil end turns 40, axially extending coil leads 50, and coil connections 60. As noted previously, each coil includes an axial coil lead that is aligned with one of the slots (e.g., coil lead 50a in FIG. 8 is aligned with slot 1, and coil lead 50b is aligned with slot 2). The coil end turns 40 provide 180° directional shifts for each diamond coil and define an apex for each coil at an axial distance outward from the stator core 12. The coil connections 60 extend axially from a slot and then turn radially outwardly and then circumferentially. Each coil connection 60 extends circumferentially around the OD side of the end turns 40 in order to connect the leads 50 from two different adjacent coils of the same phase and path. Thus, each coil connection 60 provides a series connection for adjacent coils of the same phase. These series connections could be of a contiguous wire (no connections) or could be formed by welding two individual coils.

FIGS. 7 and 8 further illustrate the interlocking nature of each coil 30a and its corresponding adjacent coils 30b within the winding arrangement 20. In particular, each coil 30a is interlocked with the corresponding adjacent coil 30b within the winding arrangement 20 such that each coil cannot be removed from the winding arrangement in a radial direction without removal of the corresponding adjacent coil. This interlocking relationship is particularly shown by the circles 81 and 82 in FIG. 8. As shown by the circle 81, the first segment 42a of the end turn of coil 30a is arranged radially inward from the coil lead 50b of the corresponding adjacent coil 30b. At the same time, as shown by circle 82, the second segment 44a of the end turn of coil 30a is arranged radially outward from the first segment 42b of the end turn of the corresponding adjacent coil 30b. As a result, coil 30a is interlocked with the adjacent coil 30b because the second segment 44a of coil 30a is trapped (i.e., enclosed) in the radial direction between the coil lead 50b and the second segment 44b of the adjacent coil. Coil 30a is also trapped in the axial direction by the adjacent coil 30b by the segments 44a and 44b of the end turn of the adjacent coil 30b.

In view of the interlocking relationship between the coils 30, it will be recognized that the winding arrangement cannot be completed by inserting the coils onto the core 12 from the ID. One reason for this is that the coil leads 50 as shown in FIGS. 1, 7 and 8 exit the slots only in the axial direction (i.e., the leads 50 are not angled similar to the shape of the coil end turns 40). As a result, the coil body of one diamond coil is arranged inward from the coil body of an adjacent coil, but the coil lead of said one coil is arranged outward from the coil adjacent body. Thus, it is not possible to insert a coil body radially into the stator core and arrive at this configuration. In particular, when trying to insert a coil body in the radial direction from the ID, it is not possible to get the axial coil lead of one coil to be positioned outward from an adjacent coil, yet have the coil body itself to be positioned inward from the same adjacent coil. In the example of FIG. 8, it would be impossible to either (a) insert coil 30b into the slots in a radial direction at the ID without the coil lead 50b of coil 30b bumping into coil 30a, or (b) insert coil 30a into the slots in a radial direction at the ID without the first segment 42a of the end turn of coil 30a bumping into the end turn of coil 30b. All the other coils in the winding arrangement 20 exhibit the same features, thus preventing them from being inserted in the radial direction from the ID. For this reason, all of the end turns 40 and coil leads 50 in the winding arrangement 20 shown in FIGS. 1, 7 and 8 must be formed differently, such as 3D printed according to the method as described below.

Method of Making the Winding Arrangement

Figure 9:
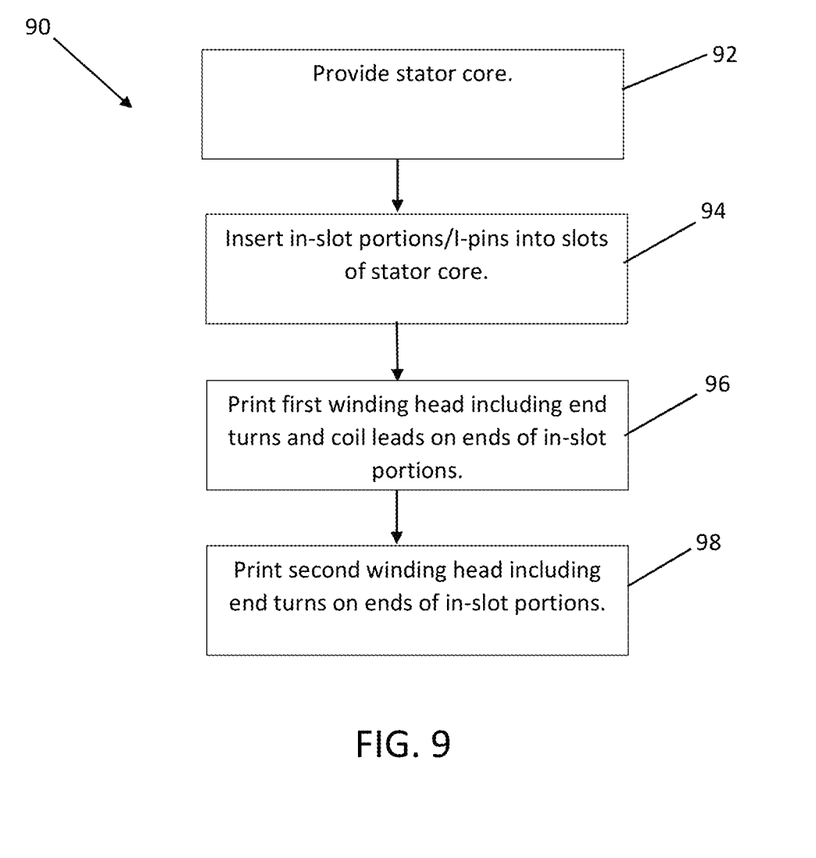
FIG. 9 is a block diagram of a method of a method of making a winding arrangement 20 with a printed winding head.

With reference now to FIG. 9, a method 90 of making a winding arrangement 20 with a printed winding head 34 is disclosed. The method 90 begins at block 92 by providing a stator core 12 with semi-closed slot openings. Next, at block 94 I-pins are inserted into the slots of the stator core 12 to provide the in-slot segments of the winding arrangement 20. As described above, the I-pins are inserted in layers within the slots (e.g., eight layers).

After the I-pins are inserted into the slots of the core 12, the method continues at block 94 and the winding head 34 is printed using an additive manufacturing technique. During this process, the coil end turns 40 and the coil leads 50 are printed onto the ends of the I-pin conductors at the first end 26 of the core 12. Any of various additive manufacturing techniques may be used as are common in the 3D printing arts, provided the selected technique should be adapted to print electrically conductive material for the winding head, such as copper. The printed winding head 34 includes a plurality of coil end turns 40, a plurality of coil leads 50, and a plurality of series connections 60 between the coils, as described above in association with the winding arrangement of FIGS. 1-7.

After the winding head 34 is printed on one end of the stator core 12, the method continues to block 96 where the stator is flipped and the second winding head 36 is printed on the opposite end of the core. The coil end turns 40 are printed onto the ends of the I-pin conductors at the second end 28 of the core 12.

In view of the foregoing, it will be recognized that a winding arrangement with 3D printed copper heads is disclosed. The coils of the winding arrangement have a non-insertable shape in the radial direction. Accordingly, the winding arrangement is formed by inserting I-pins into the slots (either radially from the ID or axially from the ends of the stator core), and then 3D printing the heads at the ends of the stator core. Thus, it will be recognized that each diamond coil 30 is not pre-formed and then inserted onto the stator core. Instead, formation of the winding arrangement is completed after the straight coil segments are inserted in the slots of the core 12 and the end turns 40 and leads are 3D printed onto the in-slot segments. One advantage of the winding arrangement 20 with the axial extending leads is the series connection is shorter and hence the electrical resistance is reduced (i.e., because the length of connections between coils is reduced).

In at least one alternative method of making a winding arrangement, only one of the winding heads is printed. According to this method, a section of wire is formed into a hairpin shape consisting of axial conductors (or I-pins) 32 contiguous with end turns that provide a winding head 36 located on a first axial end of the axial conductors 32 (i.e., on a first end of the core). Hairpin conductors of this shape are disclosed in U.S. patent application Ser. No. 17/119,522, filed Dec. 11, 2020, the entire contents of which are incorporated herein by reference. After forming the hairpin conductors, the conductors are inserted axially into the slots such that the hairpins are nested, interleaved, or otherwise arranged within the slots. Thereafter, the interlocking winding head 34 is printed onto the second axial end of the axial conductors (i.e., the second end of the core). Accordingly, it will be recognized that the winding arrangement 20 may alternatively be formed by printing the head on only one end of the core instead of both ends of the core.

In view of the discussion herein, it will be recognized that the stator may include one or more of the following features in various embodiments of the stator:
  Diamond coils;
  Stator lams stamped with semi-closed slots (i.e., slot opening at the inner diameter (ID) is narrower than the slot width at the back of the slot);
  Straight wire segments (e.g., I-pins) housed in the slots with bare copper or insulated wire;
  3D printed bare copper end loops printed on the straight segments on one axial end;
  3D printed bare copper end loops printed on the straight segments on the opposite axial end;
  The coil leads extend axially and do not follow the angle of the coils; and
  After the heads are 3D printed, the bare copper end loops are electrically insulated with epoxy/plastic/resin/varnish with a spray, dipped, coated or a similar process.

Although the various embodiments have been provided herein, it will be appreciated by those of skill in the art that other implementations and adaptations are possible. For example, in at least one embodiment, one or more of the winding heads or one or more components of the winding heads may be provided by welding or otherwise connecting separate conductor segments onto the ends of the I-pins instead of printing the components winding heads. Furthermore, aspects of the various embodiments described herein may be combined or substituted with aspects from other features to arrive at different embodiments from those described herein. Thus, it will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by any eventually appended claims.

What is claimed is:

1. A stator for an electric machine comprising:
a core including a plurality of slots; and
a winding arrangement positioned on the core, the winding arrangement comprising (i) a plurality of axial conductors positioned in the slots of the core, and (ii) a printed winding head including a plurality of 3D printed end turns positioned on an end of the core and a plurality of coil leads, each printed end turn of the plurality of 3D printed end turns extending between a pair of axial conductors, wherein:
  each printed end turn of the plurality of 3D printed end turns includes a first segment and a second segment,
  the axial conductors and the plurality of 3D printed end turns form a plurality of interlocked coils on the core such that each coil of the plurality of interlocked coils is positioned next to and interlocked with a corresponding adjacent coil in the winding arrangement, and
  the first segment of each printed end turn of the plurality of 3D printed end turns is arranged radially inward from the coil lead of the corresponding adjacent coil, and wherein the second segment of each printed end turn of the plurality of 3D printed end turns is arranged radially outward from the first segment of the end turn of the corresponding adjacent coil.

2. The stator of claim 1 wherein the plurality of 3D printed end turns are free from printed circuit board engagement.

3. The stator of claim 2 wherein each of the plurality of interlocked coils are diamond coils.

4. The stator of claim 2, wherein the first segment and the second segment of each of the plurality of 3D printed end turns meet at a vertex, wherein the first segment extends along a first end turn direction that is angled relative to an axial direction and the second segment extends along a second end turn direction that is angled relative to the axial direction.

5. The stator of claim 4 wherein each coil lead of the plurality of coil leads is associated with one of the plurality of interlocked coils and extends in a direction that is not parallel to the first end turn direction or the second end turn direction.

6. The stator of claim 5 wherein at least one coil lead of each of the plurality of interlocked coils extends in an axial direction.

7. The stator of claim 5 wherein each coil of the plurality of interlocked coils cannot be removed from the winding arrangement in a radial direction without removal of the corresponding adjacent coil.

8. The stator of claim 1 wherein the printed winding head further includes a plurality of circumferential coil connections extending between the plurality of coil leads, wherein the plurality of circumferential coil connections are arranged radially outward from the plurality of 3D printed end turns and extend in a circumferential direction, a radial direction and an axial direction relative to the core between the plurality of coil leads.

9. A stator for an electric machine comprising:
a stator core defining a plurality of slots; and
a winding arrangement including a plurality of coils positioned around the stator core, each coil of the plurality of coils including in-slot segments and head segments, the head segments including end turn segments and coil leads,
wherein each coil of the plurality of coils is positioned next to a corresponding adjacent coil in the winding arrangement, and wherein the head segments of each coil of the plurality of coils and the corresponding adjacent coil are interlocked such that an end turn segment of each coil of the plurality of coils is radially inward from a coil lead of the corresponding adjacent coil and radially outward from an end turn segment of the corresponding adjacent coil.

10. The stator of claim 9 wherein each coil of the plurality of coils extends through a first slot and each adjacent coil extends through a second slot that is immediately adjacent to the first slot on the core.

11. The stator of claim 9 wherein each of said plurality of coils are diamond coils.

12. The stator of claim 9 wherein each head segment is defined by a first end turn segment that meets a second end turn segment at an apex, and wherein each coil lead provides a path into the in-slot segments.

13. The stator of claim 12 wherein a first end turn segment of each coil of the plurality of coils is positioned radially inward from the coil lead of the corresponding adjacent coil, and wherein a second end turn segment of each coil of the plurality of coils is positioned radially outward from a first end turn segment of the corresponding adjacent coil.

14. The stator of claim 9 wherein the head segments are printed head segments, and wherein the in-slot segments and the printed head segments define electrically conductive paths for each coil of the plurality of coils.

15. A method of forming a winding arrangement for an electric machine, the method comprising:
   inserting axial conductors into slots of a stator core; and
   printing end turns positioned on an end of the stator core with an additive manufacturing technique, wherein each printed end turn extends between a pair of the axial conductors, wherein the printed end turns and the axial conductors form interlocked coils on the stator core, each of the interlocked coils including a first coil and an interlocked second coil, wherein:
      the first coil includes a first printed end turn connected to a first axial conductor extending through a first slot of the stator core, the first printed end turn including a first segment and a second segment;
      the interlocked second coil includes a second printed end turn connected to a second axial conductor extending through a second slot of the stator core, the second printed end turn including a first segment and a second segment, the second slot adjacent to the first slot on the stator core,
      the first segment of the first printed end turn is arranged radially inward from a coil lead of the second printed end turn, and the second segment of the first printed end turn is arranged radially outward from the first segment of the second printed end turn.

16. The method of claim 15 further comprising:
   printing coil leads that provide paths to the plurality of axial conductors in the slots of the stator core, the printed coil leads including the coil lead of the second printed end turn, wherein the printed coil leads have a different shape than the printed end turns.

17. A method of forming a winding arrangement for an electric machine, the method comprising:
   forming a plurality of a straight sections of wire into a plurality of nested hairpins consisting of axial conductors contiguous with end turns that form a first winding head located on a first end of the axial conductors;
   inserting the plurality of nested hairpins axially into slots of a stator core; and
   printing a second winding head located on a second axial end of the axial conductors, the second winding head including a plurality of coil leads and a plurality of end turns wherein each end turn of the plurality of end turns extends between a pair of axial conductors, wherein the plurality of nested hairpins and the second winding head form a plurality of interlocked coils on the core with each coil of the plurality of interlocked coils positioned next to a corresponding adjacent coil in the winding arrangement, and wherein an end turn segment of each coil of the plurality of interlocked coils is radially inward from a coil lead of the corresponding adjacent coil and radially outward from an end turn segment of the corresponding adjacent coil.

18. The method of claim 17 wherein the axial conductors and the 3D printed end turns form a plurality of diamond coils on the core.

* * * * *